United States Patent [19]

Amici

[11] 4,442,824
[45] Apr. 17, 1984

[54] ACCESSORY GRILL CONVERTER

[75] Inventor: Carmine J. Amici, Allentown, Pa.

[73] Assignee: C.G.J. Inc., Allentown, Pa.

[21] Appl. No.: 492,463

[22] Filed: May 6, 1983

[51] Int. Cl.³ .............................................. F24C 3/00
[52] U.S. Cl. .................. 126/14; 126/25 R; 126/39 H
[58] Field of Search ............ 126/25 R, 9 R, 9 B, 126/14, 37 A, 37 B, 38, 39 R, 39 H, 39 N, 39 B

[56] References Cited

U.S. PATENT DOCUMENTS

| | | | |
|---|---|---|---|
| 2,207,307 | 7/1940 | Teller | 126/37 B |
| 2,330,132 | 9/1943 | Martin | 126/14 |
| 2,668,527 | 2/1954 | Chambers | 126/39 H |
| 2,668,898 | 2/1954 | Von Behren | 126/39 H |
| 2,694,392 | 11/1954 | Oatley | 126/14 |
| 2,812,706 | 11/1957 | Del Francia | 126/14 |
| 2,923,229 | 2/1960 | Halford | 126/14 |
| 3,177,342 | 4/1965 | Wickenberg | 126/14 |
| 3,946,651 | 3/1976 | Garcia | 99/450 |
| 4,149,515 | 4/1979 | Hayes | 126/14 |
| 4,290,408 | 9/1981 | Juett | 126/25 R |

*Primary Examiner*—Daniel J. O'Connor
*Attorney, Agent, or Firm*—Ruth Moyerman

[57] ABSTRACT

A top grill converter for a conventional outdoor electric or gas-fired grill is disclosed. The converter is a cartridge having side, front and back walls, a foraminous floor and a roof-forming undulated heat shield. Contained within the cartridge are preferentially regulated heating elements and heat transferring rocks. Means are provided for suspending the cartridge inside the lid of a conventional outdoor cooker and other means are shown for holding the cartridge level within the lid when the lid is raised and lowered. In use, food will be placed on a grill and the converter will be lowered over the food to cook it. Because the flame is above the food, grease and liquid secretions from the food will not catch on fire and "flare-ups" are eliminated.

11 Claims, 6 Drawing Figures

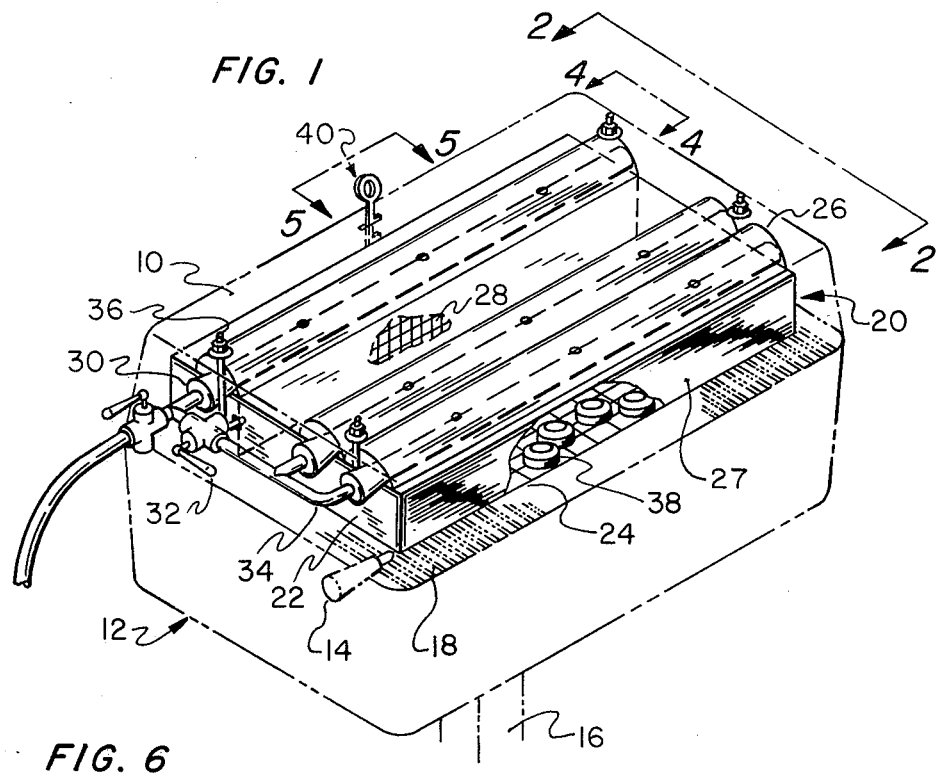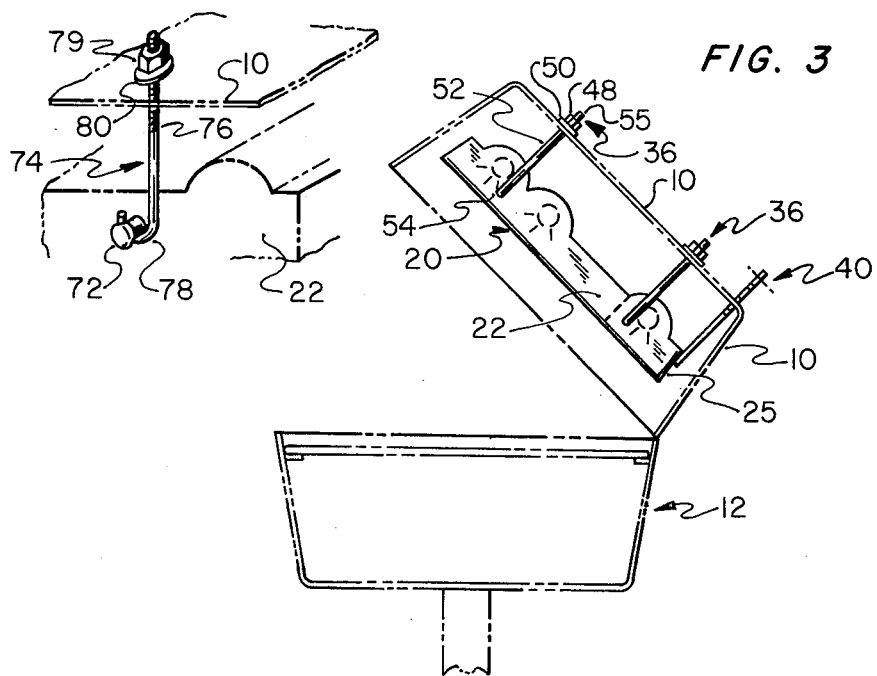

ACCESSORY GRILL CONVERTER

BACKGROUND OF THE INVENTION

1. Field of the Invention

This invention relates to cooking appliances, and more particularly to outdoor barbecue cookers.

2. Description of the Prior Art

There are many devices and accessories on the market for outdoor cooking. These devices are similar in that they provide heat underneath a grill on which food to be cooked is placed. This basic position of food above heat causes safety problems, as well as improper cooking. Fat and liquids from the food drip down onto the flames and burn, causing flare-ups. Sometimes these flare-ups burn the food—but worse, they can also burn the operator.

There are grill accessories on the market, but they are primarily for expanding the uses of indoor stoves. U.S. Pat. No. 4,149,515 to Hayes discloses a device for insertion into a wood heating stove with vertical side walls and an opening such as a door in one of the side walls. Hayes' device provides a removable broiler tray which holds food above the flame. It is not meant to be used in a top opening, outdoor cooker.

U.S. Pat. No. 3,946,651 to Garcia provides a box device to be used either on a conventional indoor stove or an outdoor grill. Garcia addresses the problem of flare-ups by an arrangement of vertically spaced grease catching traps. However, Garcia's device still places food above the heat source. Furthermore, by trapping the grease before it reaches the heat source, the Garcia device must thus be thoroughly cleaned after each use.

There are other problems with conventional outdoor cookers. Although some models provide adjustable cooking temperatures, the normal placement of burners makes keeping food warm difficult. In addition, most models are lit from underneath the barbecue grill—an awkward and sometimes dangerous position for the operator.

Also a further problem is the size of most barbecue grills. Most have parts which are larger than household sinks, making clean-up a problem.

No device is presently known which provides above-the-food heating in an attachment for conventional models of outdoor barbecue grills. No grill accessories are found that are easy to install in either a permanent or temporary mode in a variety of models of outdoor barbecue grills.

No device is known for preventing flare-ups in open flame cooking which is adaptable to conventional barbecue grills, is inexpensive to produce, and is easy to install, operate and clean.

It is, therefore, an object of this invention to provide a device which will cook food by supplying heat above the food, thereby eliminating the problem of "flare-ups".

It is another object of this invention to provide a device which can be placed in the lid of conventional outdoor barbecue cookers.

It is a further object of this invention to provide a device which can be fastened, either permanently or temporarily, to a previously owned outdoor barbecue cooker.

It is yet another object of this invention to provide a device in an outdoor barbecue grill which can keep foods warm after they are cooked.

It is a further object of this invention to provide a grill converter which can be safely and easily lit.

It is yet another object of this invention to provide a device which, by the addition of heat transferring bricks, can assure a wide spread heat source.

It is still another object of this invention to provide a device which is easily removed and disassembled for cleaning.

It is still a further object of this invention to provide a grill converter which can be used with both electric or gas outdoor barbecue cookers.

These and other objects will be more readily ascertainable to one skilled in the art from a consideration of the following Figures, description and exemplary embodiments.

BRIEF DESCRIPTION OF THE DRAWING(S)

FIG. 1 is an isometric of the preferred embodiment in place in the lid of an outdoor barbecue cooker with the cooker lid shown in phantom.

FIG. 3 is a side view showing the lid of a cooker partially raised with the device mounted in place.

Figure 4:
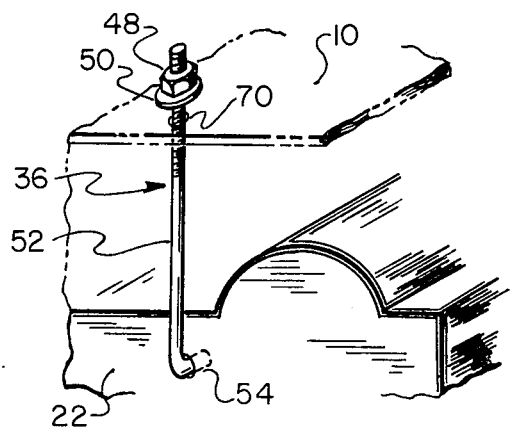

FIG. 4, taken along lines 4—4 of FIG. 1, shows the preferred hook/bolt attachment of the device to a lid of a barbecue cooker.

Figure 5:
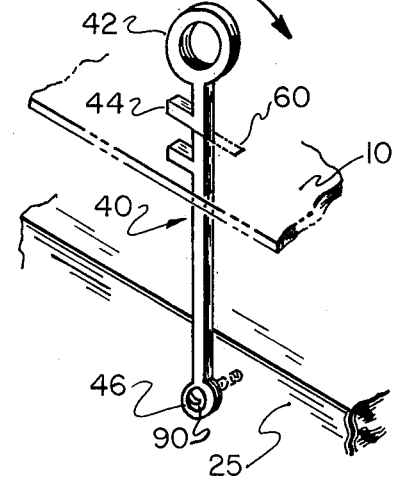

FIG. 5, taken along lines 5—5 of FIG. 1, depicts the positioning ratchet on the back wall of the cartridge.

FIG. 6 shows an alternate embodiment of the attachment means.

DETAILED DESCRIPTION OF THE PREFERRED EMBODIMENTS(S)

Referring now to the drawings, and more particularly to FIG. 1, cartridge 20 is shown inside lid 10 of a conventional outdoor barbecue cooker 12. Barbecue cooker 12 has conventional lid handle 14, support 16 and cooking grid 18. Cartridge 20 includes side walls 22, back wall 25, front wall 27, floor 24 and heat shield 26 which serves as a roof to cartridge 20. Inside cartridge 20 are seen longitudinal foraminous wall 28 separating heat element 30 from heat elements 32 and 34. Beneath heat elements 30, 32 and 34, resting on floor 24, are shown heat transferring bricks 38.

In operation, cartridge 20, suspended in lid 10 by hook assemblies 36, provides heat for cooking through heat elements 30, 32 and 34. Heat transferring bricks 38 spread the heat over cooking grid 18 on which food has been placed. When the lid is closed as in FIG. 1, food would be cooking. Grease and liquids from the cooking food would drop downward through cooking grid 18, but not onto the heat element as in conventional cookers. Thus, the problem of flare-ups caused by grease burning when it falls on the flame is eliminated.

Also shown in FIG. 1 in addition to hook assemblies 36 (shown in greater detail in FIG. 4) are positioning ratchet 40 also shown in better detail in FIG. 5.

Figure 2:
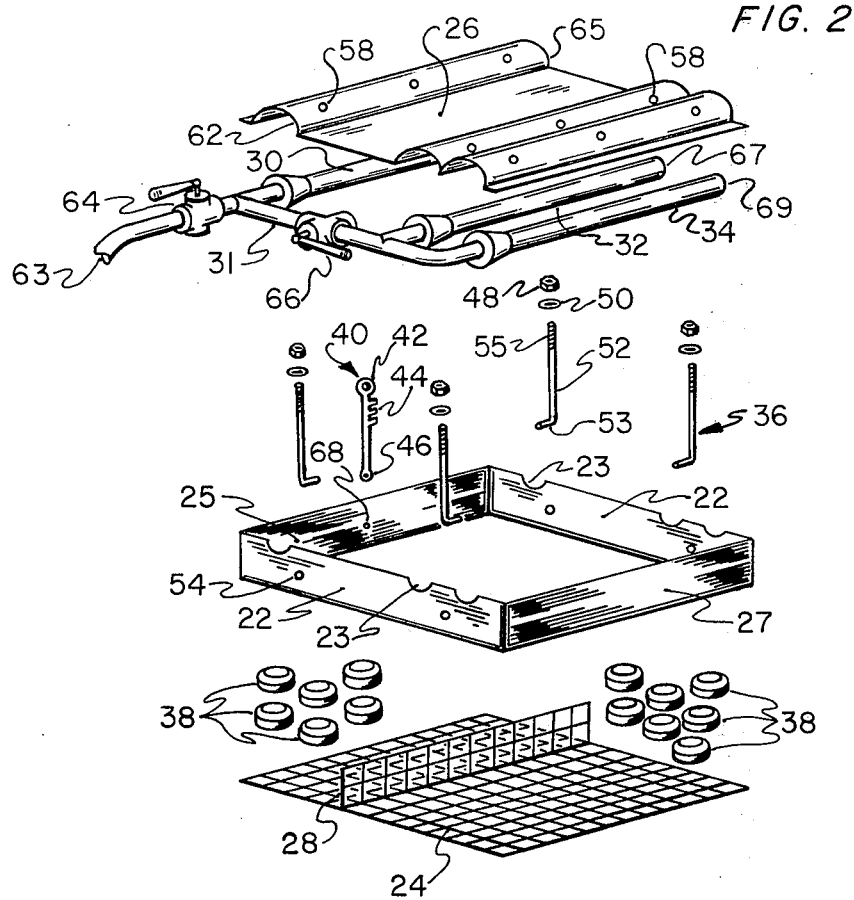
FIG. 2 is an exploded view taken along lines 2—2 of FIG. 1 showing the components of the cartridge of this invention.

Now referring to FIG. 2, an exploded view of cartridge 20 and its components is seen. Heat shield 26 is seen having openings 58. Openings 58 serve to release heat and also allow for expansion of heat shield 26 during operation. Peaks 62 of the undulations of heat shield 26 provide a raised cover for heating elements 30, 32 and 34. Placement of heating elements 32 and 34 towards the front of the cartridge is shown in this Figure. Placement of a separately operated heating element 30 on the rear of the cartridge allows heating element 30 to be used as a "warmer". Greater heat is supplied for broiling by employing heating elements 32 and 34 in the front as well as heating element 30 in the back.

Universal gas pipe 31 is connected to heating elements 30, 32 and 34 and to exterior heat source 63 through control valves 64 and 66. Control valve 64 permits entrance of gas into heating element 30 and pipe 31. Control valve 64 must always be opened for operation of cartridge 20. To produce a flame, the operator opens valve 64 at one end of heating element 30 and lights gas at opposite end of element 30 at point 65. With only heating element 30 lit and only control valve 64 open, foods may be kept warm, but will not dry out. If additional heat is desired for broiling, valve 66 will be opened and may be lit at either point 67 or point 69 of heating elements 32 or 34. When one of heating elements 32 or 34 is lit, the other will light itself from that flame. All lighting of heating elements is performed preferably at the top of outdoor cooker 12 instead of from below cooking grid 18 as is conventional. This lighting from above is much safer in addition to being easier for the operator.

Also shown in FIG. 2 are side walls 22, back wall 25 and front wall 27. Depression 23 in the tops of side walls 22 allows space for insertion of heating elements 30, 32 and 34. Thus, heat shield 26 forms a tight roof for cartridge 20 by resting evenly on the tops of walls 22, 25 and 27.

Also shown in FIG. 2 are hook assemblies 36 and positioning ratchet 40 removed from side walls 22 and back wall 25 respectively. Hook assemblies 36 are seen to include threaded hooks 52, washers 50 and bolts 48. In use, bill 53 of threaded hook 52 is inserted into aperture 54. The threaded end 55 of hook 52 is inserted through a previously formed aperture 70 in lid 10 (shown in FIG. 4). Washers 50 and bolts 48 are then tightened onto threaded end 55 of hook 52 on the outside of lid 10, thereby making the whole cartridge 20 removably attachable to lid 10. The user may easily remove all of cartridge 20 for cleaning purposes or when using his outdoor cooker 12 for other methods of cooking by reversing the steps used in securing hook assemblies 36.

Positioning ratchet 40 is also seen in FIG. 2 and includes ring holder 42, rack 44 and fastening aperture 46. Ratchet 40 is fastened to back wall 25 by placing a device such as a screw (not seen) through apertures 46 and 68 respectively. Rack 44 is pulled through slot 60 in lid 10 (shown in FIG. 5) to provide leveling means for cartridge 20. The leveling action of positioning ratchet 40 is more clearly described in FIGS. 3 and 5.

Also clearly visible in FIG. 2 are foraminous floor 24 and foraminous wall 28. Wall 28 serves two purposes—it keeps heat transferring bricks 38 from from sliding to the back when lid 10 is lifted and, since it is foraminous, it allows heat from heating elements 30, 32 and 34 to heat the whole area of floor 24. Floor 24 serves to hold heat transferring bricks 38 in place where they may spread the heat from heating elements 30, 32 and 34 and, being foraminous, floor 24 allows heat to reach the food to be cooked. It can further be seen in this view that walls 22, 25, 27 and 28 are sized to closely contain heat transferring bricks 38 so that there is little movement of heat transferring bricks 38.

Looking now at FIG. 3, the purpose of positioning ratchet 40 is clearly seen. Fastened through lid 10 onto back wall 25, positioning ratchet 40 holds cartridge 20 level and prevents cartridge 20 from tilting inside lid 10 when lid 10 is raised and lowered. Also shown in FIG. 3 within open lid 10 are hook assemblies 36. Bolts 48 and washers 50 are seen fastened to threaded end 55 of hook 52 on outside of lid 10. Hooks 52 extend inside lid 10 so that bills 53 (not seen) of hooks 52 may be placed into apertures 54 in wall 22, suspending cartridge 20 inside lid 10.

Looking now at FIG. 4, hook assembly 36 is shown in detail. Lid 10 (shown in phantom) has an aperture 70 through which the threaded end of hook 52 is extended. Bolt 48 and washer 50 are wound on threaded end 55 of hook 52 until washer 50 is closely forced onto lid 10. Bill 53 of hook 52 is pushed through aperture 54 in side wall 22. Thus, when all hook assemblies 36 are fastened in lid 10 and through side walls 22, cartridge 20 will be securely suspended from lid 10.

Referring now to FIG. 5, this Figure clearly shows positioning ratchet 40 in working position in lid 10. Fastening apeerture 46 has been rotatably mounted with screw 90 into back wall 25 through aperture 68 (shown in FIG. 2). Rack 44 of positioning ratchet 40 has been pulled by ring holder 42 through slot 60 in lid 10. Positioning ratchet 40 is then slid over so that rack 44 rests on lid 10, holding positioning ratchet 40 firmly in place. When positioning ratchet 40 is in place, cartridge 20 will be held level and will not tilt.

Referring now to FIG. 6, an alternate embodiment is shown. Hook 74 is fastened at threaded end 76 into lid 10 by bolt 79 and washer 80. Hook 74 has curved bill 78 instead of a straight bill 53 such as found on hook 52. Curved bill 78 hooks onto detent 72 on wall 22. Detent 72 is shown as a knob. In this embodiment, one hook 74 will be used on each side of the cartridge to provide an easily removable assembly for temporary installment of cartridge 20 in lid 10.

There are many variations which may be practiced within the scope of this invention. Chiefly, the cartridge of this invention may be placed in a barbecue grill permanently. In such a use, positioning ratchet 40 and hook assemblies 36 could be permanently secured.

In a variation possilbe within permanent installation, lid 10 of barbecue cooker 12 could be adapted to become a griddle, thus expanding the uses of the entire cooker. In such a variation, cartridge 20 could be placed in brackets on the griddle and still be within the scope of this invention.

In another variation, hook assemblies 36 may be attached to cartridge 20 at their bills by hooking bills 53 onto detents, such as knobs, placed on exterior of walls 22. This variation provides a temporary installation of cartridge 20 as shown in FIG. 6.

Although the preferred embodiment has been shown as using gas, electric cookers may also be converted with the use of this cartridge. Such a use is also within the scope of this invention.

The spacing of the heating elements is not limited to that which is shown, nor is their number. Although perferential regulation of heating elements is shown, the invention is not limited to such regulation.

There are many advantages to the cartridge of this invention. Primarily, by providing a converter which supplies a grill's heat above the cooking surface, the possibility and dangers of "flare-ups" are eliminated.

Another advantage is that this grill converter is easily installed in either a permanent or temporary mode, expanding the cooking possibilities for the user.

Also an advantage is that this unit is easily removable for cleaning purposes and sized to fit in the common household sink.

A further advantage of this invention is that this grill converter allows lighting to be done at a more convenient height than is normally possible, a factor which reduces the risk of the user being burned.

Another advantage of the cartridge of this invention is its close retention of the heat transferring bricks. The life of the bricks is extended because they are not subject to friction by frequent movement. Also, because they do not become grease coated, their heating effectiveness remains.

Having now illustrated and described my invention, it is not intended that such description limit this invention, but rather that this invention be limited only by a reasonable interpretation of the apended claims.

What is claimed is:

1. A top grill converter for a conventional outdoor electric or gas-fired grill comprising:
   (a) a generally parallelpipedal cartridge having a foraminous floor;
   (b) a back wall, front wall and side walls attached along bases of said walls to said foraminous floor, said walls being of a sufficient height to provide containment for heat transferring bricks intended to rest on said foraminous floor;
   (c) a roof-forming, undulated heat shield attached to said walls along the uppermost edges of said walls, said undulations paralleling the longitudinal axis of said cartridge, and said undualted heat shield's troughs being located proximate the top of said walls, and said undulated heat shield's peaks providing space and protection for heating elements;
   (d) heating elements located longitudinally inside said parallelpipedal cartridge under said heat shield in spaces created by said undulated heat shield's peaks, one end each of said heating elements attached to an exterior heat source; and,
   (e) means for suspending said cartridge beneath and inside a lid of said conventional outdoor grill.

2. The cartridge according to claim 1 wherein said means for suspending said cartridge from said lid comprises a removable assembly, at least one on each side, including a hook/bolt demountably attached at its bolt end into said lid, bill of said hook/bolt placed in an aperture in short side wall of said parallelpipedal cartridge.

3. The cartridge according to claim 1 wherein said heat shield's peaks include apertures for the release of heat to allow for expansion of said heat shield during operation of said cartridge.

4. The cartridge according to claim 1 wherein said means for suspending said cartridge from said lid in a permanent installation includes a set of bolts fixed through said heat shield into said lid proximate four corners of said cartridge.

5. The cartridge according to claim 1 wherein said cartridge includes, additionally, a longitudinal foraminous wall between heat element adjacent to back wall and said other heat elements and touching said foraminous floor and said heat shield on opposing lengthwise edges.

6. The cartridge according to claim 1 wherein said cartridge includes, additionally, as a latching means on said back wall, a positioning ratchet, said ratchet sliding through and being caught by said rack of said ratchet in a slot in said lid, whereby when said lid is raised to varying heights,, said cartridge may be held parallel to a cooking grid.

7. The cartridge according to claim 1 wherein said longitudinally placed heating elements are unevenly spaced within said cartridge, said heat elements closest to front wall being more closely aligned to each other than to said element adjacent to said back wall.

8. The cartridge according to claim 1 wherein said undulations form three peaks, said peaks forming a cover for three longitudinally placed heating elements.

9. The cartridge according to claim 9 including means for preferentially regulating said heating elements, whereby when only warming is desired, the two elements closest to said front wall may be turned off.

10. The cartridge according to claim 1 wherein said means for suspending said cartridge from said lid comprises a removable assembly, one on each side, including a hook/bolt demountably attached at its bolt end into said lid, bill of said hook/bolt hooking on a detent on short side of said parallelpipedal cartridge, said detent located between front edge and horizontal midpoint of said short side wall.

11. The cartridge according to claim 10 wherein said detent on side wall is a knob.

* * * * *